US012701390B2

(12) United States Patent
Chauhan

(10) Patent No.: US 12,701,390 B2
(45) Date of Patent: Aug. 4, 2026

(54) ENHANCED COMMUNICATION SERVICES BASED ON ITINERARY DATA

(71) Applicant: T-Mobile USA, Inc., Bellevue, WA (US)

(72) Inventor: Kanakrai Chauhan, Snoqualmie, WA (US)

(73) Assignee: T-Mobile USA, Inc.

( * ) Notice: Subject to any disclaimer, the term of this patent is extended or adjusted under 35 U.S.C. 154(b) by 312 days.

(21) Appl. No.: 18/497,795

(22) Filed: Oct. 30, 2023

(65) Prior Publication Data

US 2024/0064499 A1 Feb. 22, 2024

Related U.S. Application Data

(62) Division of application No. 17/383,996, filed on Jul. 23, 2021, now Pat. No. 11,838,840.

(60) Provisional application No. 63/067,265, filed on Aug. 18, 2020.

(51) Int. Cl.
*H04W 4/50* (2018.01)
*H04W 4/021* (2018.01)

(52) U.S. Cl.
CPC ............. *H04W 4/50* (2018.02); *H04W 4/021* (2013.01)

(58) Field of Classification Search
CPC ....... H04W 4/50; H04W 4/021; H04W 4/025; H04W 4/029; H04W 4/90
See application file for complete search history.

(56) References Cited

U.S. PATENT DOCUMENTS

| | | | |
|---|---|---|---|
| 6,983,155 B1 | 1/2006 | Cook | |
| 9,305,181 B1 | 4/2016 | Watson et al. | |
| 9,491,580 B1 | 11/2016 | Hagon et al. | |
| 9,759,570 B2 * | 9/2017 | Joao ........................ | G01S 19/13 |
| 11,838,840 B2 | 12/2023 | Chauhan | |
| 2006/0205404 A1 | 9/2006 | Gonen et al. | |
| 2012/0190386 A1 * | 7/2012 | Anderson ............... | G01S 19/14 |
| | | | 455/456.3 |
| 2019/0035508 A1 * | 1/2019 | Roh ........................ | G16H 10/60 |
| 2019/0156441 A1 * | 5/2019 | Bhatia .................... | G06Q 50/01 |
| 2019/0332839 A1 | 10/2019 | Papazian | |
| 2019/0335318 A1 | 10/2019 | Vagelos | |

OTHER PUBLICATIONS

U.S. Appl. No. 17/383,996, Notice of Allowance mailed Jul. 27, 2023, 31 pages.
U.S. Appl. No. 17/383,996, Office Action mailed Feb. 28, 2023, 34 pages.

* cited by examiner

*Primary Examiner* — Charles R Craver

(57) ABSTRACT

Described herein are techniques for providing enhanced services to a user device based on itinerary data. Such techniques may comprise receiving itinerary data that comprises an indication of at least one event associated with a user device, determining, based on the itinerary data, a temporary user device identifier to be provisioned onto the user device in relation to the at least one event, providing the temporary user device identifier to the user device to be provisioned onto the user device while the at least one event is occurring, and upon receiving a communication directed toward the temporary user device identifier while the at least one event is occurring, routing the communication to the user device.

13 Claims, 7 Drawing Sheets

100

BOOKING
APPLICATION
SERVERS 110

ITINERARY
DATA
114

SERVICE
DATA
124

RULES
DATA
116

122

MOBILE
APPLICATION
112

NETWORK
106

CALL
ROUTING
MODULE
120

SERVICE
PROVIDER
COMPUTER 108

USER
DEVICE 104

USER
102

ADDITIONAL
USER
DEVICES
118

THIRD-PARTY
COMPUTER 122

400

402

RECEIVE ITINERARY
DATA FOR USER

404

STORE EVENTS/
DATES FROM
ITINERARY DATA

406

DETERMINE
UPCOMING OR
CURRENT STATUS

412

MONITOR FOR
STATUS UPDATES

408

IDENTIFY SERVICES
ASSOCIATED WITH
STATUS

410

RELEVANT
SERVICE
IDENTIFIED?

No

YES

414

PROVIDE EVENT DATA
TO SERVICE
PROVIDER

600

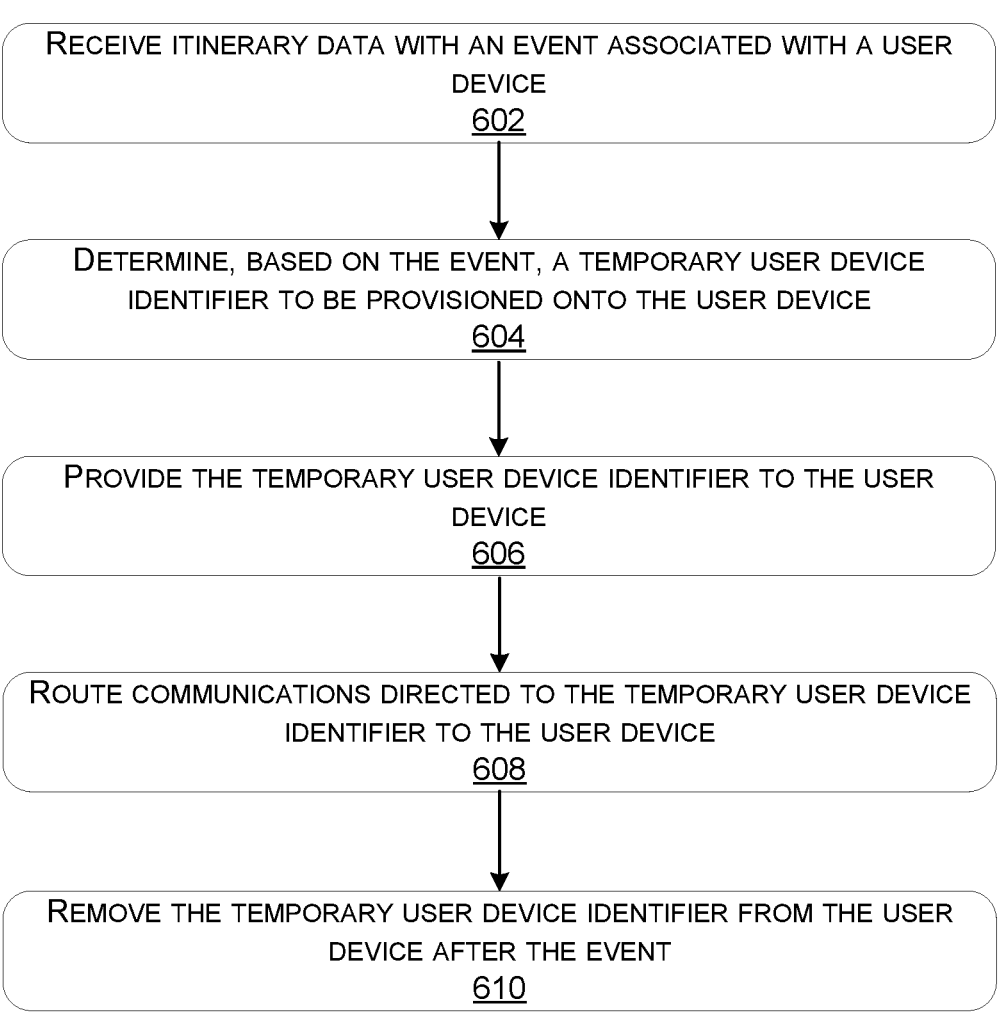

RECEIVE ITINERARY DATA WITH AN EVENT ASSOCIATED WITH A USER
DEVICE
602

DETERMINE, BASED ON THE EVENT, A TEMPORARY USER DEVICE
IDENTIFIER TO BE PROVISIONED ONTO THE USER DEVICE
604

PROVIDE THE TEMPORARY USER DEVICE IDENTIFIER TO THE USER
DEVICE
606

ROUTE COMMUNICATIONS DIRECTED TO THE TEMPORARY USER DEVICE
IDENTIFIER TO THE USER DEVICE
608

REMOVE THE TEMPORARY USER DEVICE IDENTIFIER FROM THE USER
DEVICE AFTER THE EVENT
610

RECEIVE ITINERARY DATA WITH AN EVENT ASSOCIATED WITH A USER DEVICE
702

DETERMINE AT LEAST ONE SERVICE ASSOCIATED WITH THE USER DEVICE
704

GENERATE A NOTIFICATION COMPRISING INFORMATION ABOUT THE EVENT
706

PROVIDE THE NOTIFICATION TO A PROVIDER OF THE AT LEAST ONE SERVICE
708

ENHANCED COMMUNICATION SERVICES BASED ON ITINERARY DATA

CROSS REFERENCE TO RELATED APPLICATIONS

This application is a divisional of U.S. application Ser. No. 17/383,996, filed Jul. 23, 2021, which claims the benefit of U.S. Application 63/067,265, filed Aug. 18, 2020, both of which are incorporated by reference.

BACKGROUND

Travel, for both pleasure and business, has become increasingly accessible in recent years. However, such travel is often arranged across a number of different entities that do not interact in any meaningful way. This can result in a user's travel information being disparate and unusable.

SUMMARY

Techniques are described herein for providing enhanced communication services to a user device based on itinerary data for that user device. In such techniques, itinerary data is received from one or more third-party servers (e.g., booking application servers) with respect to a user device. A number of different actions can be taken based on that itinerary data.

In one embodiment, a method is disclosed as being performed by a service provider computer, the method comprising receiving itinerary data that comprises an indication of at least one event associated with a user device, determining, based on the at least one event, a temporary user device identifier to be provisioned onto the user device in relation to the at least one event, providing the temporary user device identifier to the user device to be provisioned onto the user device while the at least one event is occurring, and upon receiving a communication directed toward the temporary user device identifier while the at least one event is occurring, routing the communication to the user device.

An embodiment is directed to a computing device comprising: a processor; and a memory including instructions that, when executed with the processor, cause the computing device to receive itinerary data that comprises an indication of at least one event associated with a user device, determine, based on the at least one event, a temporary user device identifier to be provisioned onto the user device in relation to the at least one event, provide the temporary user device identifier to the user device to be provisioned onto the user device while the at least one event is occurring, and upon receiving a communication directed toward the temporary user device identifier while the at least one event is occurring, route the communication to the user device.

An embodiment is directed to a non-transitory computer-readable media collectively storing computer-executable instructions that upon execution cause one or more computing devices to perform acts comprising receiving itinerary data that comprises an indication of at least one event associated with a user device, determining, based on the at least one event, a temporary user device identifier to be provisioned onto the user device in relation to the at least one event, providing the temporary user device identifier to the user device to be provisioned onto the user device while the at least one event is occurring, and upon receiving a communication directed toward the temporary user device identifier while the at least one event is occurring, routing the communication to the user device.

Another embodiment is directed to a method comprising receiving itinerary data that comprises an indication of at least one event associated with a user device, determining at least one service associated with the user device and relevant to the at least one event, generating a notification comprising information about the at least one event, the information indicating a timeframe over which the at least one event is to occur, and providing the notification to a provider of the at least one service.

The foregoing, together with other features and embodiments, will become more apparent upon referring to the following specification, claims, and accompanying drawings.

BRIEF DESCRIPTION OF THE DRAWINGS

The detailed description is described with reference to the accompanying figures, in which the left-most digit(s) of a reference number identifies the figure in which the reference number first appears. The use of the same reference numbers in different figures indicates similar or identical items.

FIG. 6 depicts a flow diagram showing an example process flow for provisioning a temporary user device identifier onto a user device based on itinerary data in accordance with embodiments.

DETAILED DESCRIPTION

Figure 1:
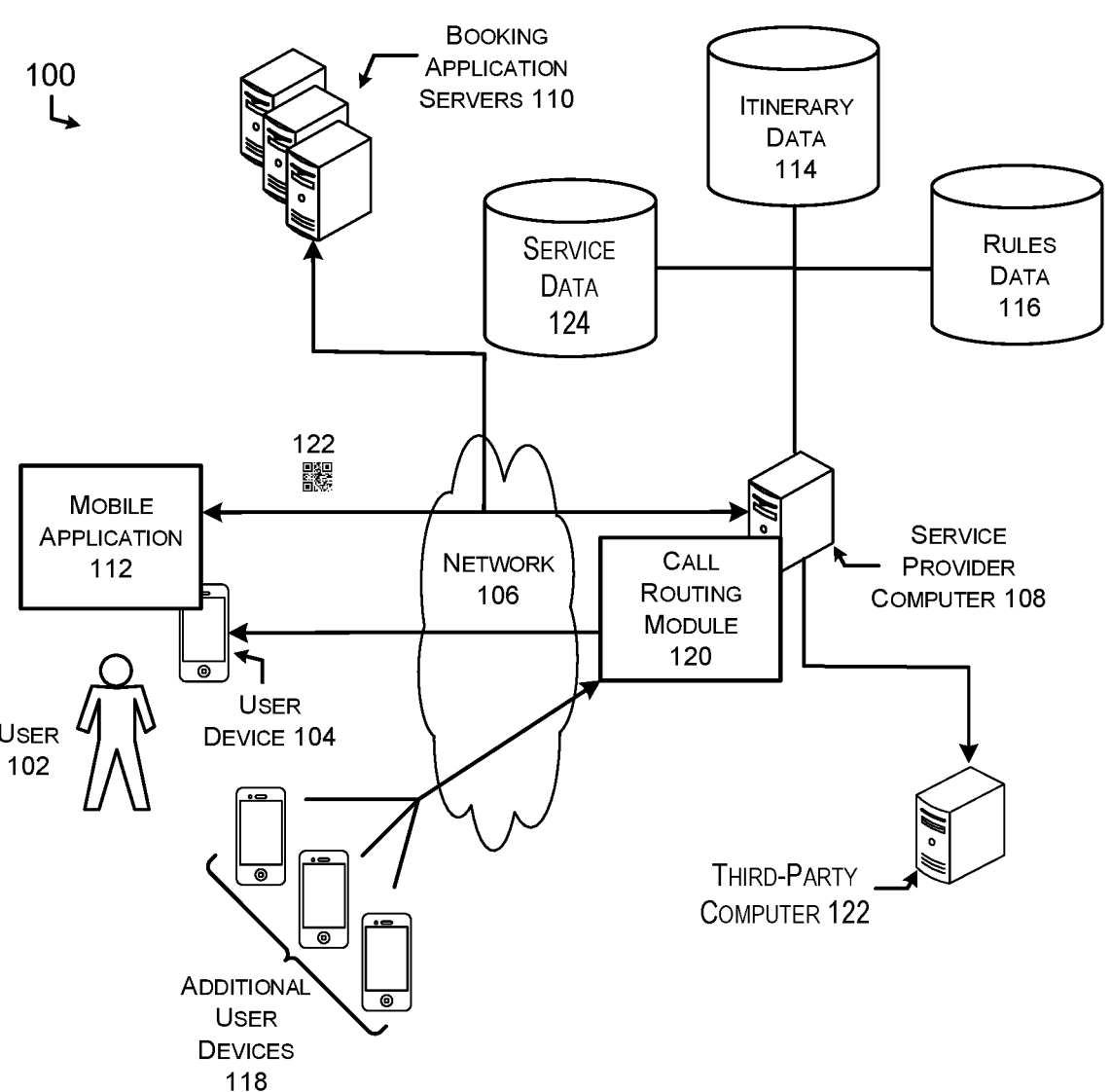
FIG. 1 depicts a first illustrative system that may be implemented in accordance with various embodiments of the disclosure.

In the following description, for the purposes of explanation, specific details are set forth in order to provide a thorough understanding of certain embodiments. However, it will be apparent that various embodiments may be practiced without these specific details. The figures and description are not intended to be restrictive. The word "exemplary" is used herein to mean "serving as an example, instance, or illustration." Any embodiment or design described herein as "exemplary" is not necessarily to be construed as preferred or advantageous over other embodiments or designs.

Described herein are techniques that relate to enhanced communication services to be provided to a user based on itinerary data for that user. In some embodiments, such techniques relate to a system and techniques for enabling improved call routing based on itinerary data. Itinerary information for a user may include an indication of one or more events as well as corresponding dates.

In one embodiment, one or more rules are implemented based on the itinerary information when routing calls to the user. For example, in some embodiments, only calls originating from specified callers may be routed to the user during certain events indicated via the itinerary data. By way of a second example, a system of the service provider computer may determine that the user is visiting a particular region or location and may assign a new user device identifier associated with that region or location to be assigned to the user. In this example, the system of the service provider computer may generate a machine-readable code that includes the new user device identifier. Upon being scanned by a user device, the machine-readable code causes the new user device identifier to be provisioned onto that user device.

In another embodiment, itinerary information is used to assign and provision a local number onto a mobile device. In this embodiment, a user may indicate that the user is going to travel to a particular location outside of the US. The user is then provided with a machine-readable code (e.g., a barcode, a QR code, etc.) that, when scanned, causes a mobile device to retrieve a new network ID from a network location. The network ID, which is local to the location to be visited, is then provisioned onto the mobile device by overwriting a current network ID. Once the new network ID is provisioned onto the mobile device, incoming and outgoing calls made by the mobile device are associated with a local number. This allows people at the location to contact the user via a local number. Additionally, wireless carriers may maintain a mapping of the new network ID to the old network ID. Calls directed to the old network ID are automatically forwarded to the new network ID. Not only does this enable the user to continue receiving calls at his or her actual phone number, but calls made to the US can be re-associated with the old network ID, so that the user will show up appropriately on caller ID.

In another embodiment, itinerary information is used in conjunction with a travel profile set by a user to enable smart routing of calls made to the user. In this embodiment, a user sets rules that associate particular activities with call routing preferences. For example, the user may create a separate whitelist or blacklist of users for each potential situation. When the user receives a call, the system may determine a current status for the user based on his or her itinerary (e.g., at the airport, driving, etc.) and may route calls based on that status. For example, the user may create a rule that only his spouse, child, or supervisor may call him when he is at the airport. In this example, calls made to the user while he is at the airport from any of these three people would be routed to his mobile device whereas calls made to the user by another person may be routed to his voicemail automatically.

In another embodiment, itinerary information is used in conjunction with a travel profile set by a user to enable smart routing of calls made to the user. In this embodiment, a user sets rules that associate particular activities with call routing preferences. For example, the user may create a separate whitelist or blacklist of users for each potential situation. When the user receives a call, the system may determine a current status for the user based on his or her itinerary (e.g., at the airport, driving, etc.) and may route calls based on that status. For example, the user may create a rule that only his spouse, child, or supervisor may call him when he is at the airport. In this example, calls made to the user while he is at the airport from any of these three people would be routed to his mobile device whereas calls made to the user by another person may be routed to his voicemail automatically.

In another embodiment, services associated with a user may be identified by a system. A determination is then made by the system based on a status of the user determined from the itinerary data, whether those services are to be modified.

In some embodiments, modifications to be made to various services may be stored as service data along with specified statuses under which the modifications are to be made. When a system has detected that a modification is to be made to a particular service, the system provides a notification to a third-party provider of the service to be modified. The notification may include a period of time for which the modification is to be effective.

In another embodiment, itinerary information is used to update emergency service location data (e.g., e911 data). Conventionally, emergency services rely upon profile information and real-time location information. If real-time location information is unavailable, then police and rescue personnel have to rely upon a user's profile information, which may not be useful if the user is currently traveling. In this embodiment, profile data may be supplemented to include an indication of what locations the user is visiting and at what dates/times. This would help identify appropriate police and rescue personnel as well as to facilitate police and rescue personnel in locating the user.

In another embodiment, itinerary information is used to notify home monitoring and security services of a user's absence from his or her home. During periods in which the user is known to be away from home, the home monitoring service can increase monitoring and/or recommend an upgraded security monitoring package. For example, during typical home security monitoring, the monitoring service may contact the user at his or her phone number to ensure that the user did not trigger the alarm. In this example, if the monitoring service is unable to contact the user or if the user indicates that s/he did not trigger the alarm, the monitoring service may then contact the police. However, if the monitoring service receives an indication from the system that the user is away from home, then the monitoring service may not attempt to contact the user and may instead immediately contact the police. By way of another example, a system, upon determining that the user is away from his or her home, may provide additional access to cameras or other sensors inside or around the user's home during the period for which the user is away. In yet another example, the security monitoring service may be caused to increase patrols (e.g., security guard patrols) around the home or to cause those on patrol to include additional checks (e.g., inspections of windows and doors or periodically entering) of the home.

In another embodiment, itinerary information is used to provide authentication for credit card purchases. In this embodiment, a wireless carrier identifies one or more credit card issuers that are associated with a user that is going to be traveling. During the user's travel, the wireless carrier provides a list of locations and dates to the credit card issuers so that those issuers can use that information when authenticating transactions made by the user.

In another embodiment, itinerary information is used to facilitate user access to services provided by wireless access points on an airplane. For example, conventionally, a wireless customer would not have access to their wireless carrier during a flight. The user may instead access various services via a wireless access point located on an airplane. Conventionally, a user requesting access to a service provided via a wireless access point on an airplane must request access to the service by providing a phone number. The phone number is then provided (e.g. via satellite connection) to a backend server, which then confirms that the phone number is to be granted access to the service. This can be time consuming. In this embodiment, the wireless carrier provides each wireless access point with a list of each of the phone numbers known to be on a particular flight that includes the wireless access point. This list is then stored locally on the wireless access point. When a user attempts to connect to the wireless access point, the wireless access point determines whether the user's phone number is on the provided list prior to establishing a satellite connection. This decreases the time and resources needed to validate that a user should be given access to services provided by the wireless access point.

In another embodiment, itinerary information is used to support a wireless carrier's business customers. In this embodiment, the wireless carrier's business customers are provided the opportunity to register as a business that services tourists and travelers. Those tourists and travelers may then be offered a discount or other incentive for visiting the registered business. In another case, users traveling to a particular location may be provided with one or more coupons or other promotions applicable to registered businesses near the location to which the user is traveling.

Embodiments of the disclosure provide several advantages over conventional systems. For example, embodiments of the system described herein enable user devices to be provisioned with a temporary user device identifier that can be used for communication when the user device is located within a region outside of a service area associated with that user device. This further enables users located within the geographic region to contact the operator of the user device via a local contact number. Additionally, some embodiments of the disclosure enable service provider computers to better provide personalized services to users automatically.

FIG. 1 depicts a first illustrative system 100 that may be implemented in accordance with various embodiments of the disclosure. As will be appreciated, although a single type of environment is used for purposes of explanation, different environments may be used, as appropriate, to implement various embodiments of the illustrative system. FIG. 1 depicts an illustrative system 100 that includes a user 102 having at least one user device 104 operable to send and receive data over a network 106 to a service provider computer 108. In some embodiments, the service provider computer 108 is in communication with one or more additional computing devices, such as one or more booking application servers 110. The user device 104 may have installed upon it a mobile application 112 that facilitates communication with the service provider computer 108.

The service provider computer 108 may additionally maintain databases for itinerary data 114 as well as rules data 116. Additionally, the service provider computer 108 may be configured to route calls from a number of additional user devices 118. The service provider computer 108 may include at least a call routing module 120 configured to make routing determinations based at least in part on data retrieved from itinerary data 114 and/or rules data 116. Additionally, the service provider computer 108 may be configured to communicate event data to at least one third-party computer 122.

The user device 104 can include any suitable electronic device operable to send and receive requests, messages or information over an appropriate network 106 and convey information back to a user of the device 104. Examples of such user devices include personal computers, cell phones, handheld messaging devices, laptop computers, set-top boxes, personal data assistants, electronic book readers and the like.

The network 106 can include any appropriate network, including an intranet, the Internet, a cellular network, a local area network or any other such network or combination thereof. Components used for such a system can depend at least in part upon the type of network and/or environment selected. Protocols and components for communicating via such a network may be known to one skilled in the art and will not be discussed herein in detail. Communication over the network can be enabled by wired or wireless connections and combinations thereof.

The service provider computer 108 can include any computing device configured to perform at least a portion of the operations described herein. Service provider computer 108 may be composed of one or more general purpose computers, specialized server computers (including, by way of example, PC (personal computer) servers, UNIX® servers, mid-range servers, mainframe computers, rack-mounted servers, etc.), server farms, server clusters, or any other appropriate arrangement and/or combination. Service provider computer 108 can include one or more virtual machines running virtual operating systems, or other computing architectures involving virtualization such as one or more flexible pools of logical storage devices that can be virtualized to maintain virtual storage devices for the computer.

In accordance with at least some embodiments, the service provider computer 108 may maintain, or have access to, a number of components, including itinerary data 114 that includes a number of details related to event timing for one or more users, a call routing module 120 configured to make routing determinations for calls made to the user device 104, rules data 116 that indicates routing rules to be applied during particular events, and service data 124 that indicates one or more services associated with users as well as third-party providers of those services. For the purposes of this disclosure, an itinerary may include any indication of a status or event to occur at a particular date/time. In some embodiments, the status or event may pertain to a particular location or region in which the user will be located at the particular date/time.

Various interactions may occur between the described components of the system 100. In the system 100, a user 102 may use the user device 104 to create an itinerary. In one example, the user may book a flight, hotel, or car rental through one or more booking application servers 110. In another example, a user may purchase a ticket to a concert or other upcoming event through a booking application server 110. The user may interface with the booking application server 110 via an online web portal provided by the booking application server 110 and accessible through a web browser, or via an application that is configured to interface with the booking application server 110. In either of these examples, the user device 104 may communicate with the booking application server 110 directly or via a connection facilitated by the service provider computer 108. Once the user has created an itinerary via the one or more booking application servers 110, that itinerary is provided to the service provider computer 108, which then records an indication of one or more events and corresponding dates/times from the itinerary in the itinerary data 114 in association with the user 102.

One or more actions may be taken by the service provider computer 108 based on the itinerary data. In one example, the service provider computer 108 may identify a region or location that the user will visit based on the itinerary data. In this example, the service provider computer 108 may generate a new user device identifier associated with the region or location to be mapped to the user device. In some embodiments, the new user device identifier may be an identifier assigned to the user device by a wireless carrier network. The service provider computer may generate a machine-readable code 122 (e.g., a barcode, a QR code, etc.)

that includes the generated new user device identifier. This machine-readable code 122 may be printed or otherwise displayed for presentation to the user device 104. The user device 104 may be caused to obtain and provision the new user device identifier from the machine-readable code upon scanning it. In this way, the user 102 may use the user device 104 to scan the machine-readable code 122 when the user gets to the region or location, causing the new user device identifier to be provisioned onto the user device 104, such that communications directed to the new user device identifier are routed to the user device 104. The service provider computer 108 stores a mapping between the new user device identifier and the user device identifier previously provisioned onto the user device 104.

Once the new user device identifier has been provisioned onto the user device 104, communications (e.g., phone calls, text messages, etc.) directed to either the new user device identifier or the previously-provisioned user device identifier may be directed to the user device 104 via the call routing module 120. For example, calls made by the additional user devices 118 directed to the previously-provisioned user device identifier may be directed to the call routing module 120. The call routing module 120 may then identify the mapping between the previously-provisioned user device identifier and the new user device identifier. The call routing module 120 may then route the call to the user device 104 via the new user device identifier. Similarly, calls made by the additional user devices 118 directed to the new user device identifier may also be directed to the call routing module 120. The call routing module 120 may then route those calls to the user device 104 via the new user device identifier. This advantageously enables a user device 104 to be provisioned with a user device identifier that is local to a particular region or location, allowing other users in that region or location to contact the user device 104 without incurring additional expenses.

In another example, the service provider computer 108 may determine one or more events associated with the user, each of the one or more events relating to a status to be associated with the user at a specified date/time. In this example, the service provider computer 108 may identify services associated with the user as well as modifications or updates to be made to those services during particular statuses. For example, a user may provide one or more rules to the service provider computer 108 to be stored in the rules data 116. For example, the user may access an online web portal for inputting the rules of the service provider computer 108 via a web browser or a dedicated application on a user device. The one or more rules may include an indication of various statuses or events as well as services or modifications to services to be implemented during those various statuses or events. In one example, the user 102 may provide an indication of services to be implemented when the user is traveling overseas. By way of illustration, the user may indicate that his or her home security monitoring service is to be increased (e.g., more frequency site patrols and/or onsite visits) and that his or her credit card issuers is to be notified. At a later date, the service provider computer 108 may then determine, based on the itinerary data for the user, that the user is traveling overseas. Upon making this determination, the service provider computer may provide instructions to the user's home security monitoring service provider computer as well as each of the user's credit card issuers.

In some embodiments, a user may provide one or more rules to the service provider computer 108 to be stored in the rules data 116. The one or more rules may include an indication of various statuses or events as well as users that can/cannot contact the user during those various statuses or events. For example, the user 102 may provide a set of users that are allowed to contact the user 102 when the user 102 is traveling. When communications made by the additional user devices 118 are directed to the user device 104, the service provider computer 108 may determine a current status of the user at the time of the call based on the itinerary data associated with the user. The service provider computer 108 may then determine, based on the provided rules stored in the rules data 116, whether the calls are to be routed to the user device 104. Provided that the rules dictate that a call is be routed to the user device based on a current status of the user, the call is routed to the user via the call routing module 120.

The illustrative system includes a service provider computer 108. However, it should be understood that a service provider computer 108 can be several computers, layers, or other elements, processes or components, which may be chained or otherwise configured, which can interact to perform tasks such as obtaining data from an appropriate data store. As used herein the term "data store" refers to any device or combination of devices capable of storing, accessing and retrieving data, which may include any combination and number of data servers, databases, data storage devices and data storage media, in any standard, distributed or clustered environment. The service provider computer can include any appropriate hardware and software for integrating with the data store as needed to execute aspects of one or more applications for the user device, handling a majority of the data access and business logic for an application in stalled upon (and executed from) the user device. The service provider computer provides access control services in cooperation with the data store and is able to generate content such as text, graphics, audio and/or video to be transferred to the user device, which may be served to the user in the form of HyperText Markup Language ("HTML"), Extensible Markup Language ("XML") or another appropriate structured language in this example.

The system may include a user device that may access the network through an access network via a wireless connection known as the air interface. The air interface may include cellular division multiple access (CDMA), time division multiple access (TDMA), frequency division (FDMA) and future iterations of cellular division, time division and frequency division wireless communications techniques. Examples include orthogonal frequency division multiple access techniques used in current versions of the air interface.

The network side of the air interface terminates with an antenna on a base station which operates as a local smart router. Base stations then access a core network over wired connection known as backhaul. Backhaul is often comprised of fiber optic communications cables. Because multiple antennas and base stations act as collectors funneling user equipment signals to the core network, i.e., providing access to the core network, this portion of the network is known as the access network.

The core network is the portion of the network where routing, billing, policy implementation and other communications services are implemented. Routing may be performed by core network servers such as a Serving GPRS Serving Node (SGSN) and a Gateway GPRS Serving Node (GGSN) for 3G and by Proxy-Call State Control Function (P-CSCF), Serving-Call State Call Function (S-CSCF) and Interrogating-Call State Control Function (I-CSCF) functions for IMS. Service application servers, also known as enterprise information technology (EIT) servers implement application servers. Services are sometimes accessed via the Internet. A gateway provides an interface of the core network to the Internet.

For clarity, a certain number of components are shown in FIG. 1. It is understood, however, that embodiments of the disclosure may include more than one of each component. In addition, some embodiments of the disclosure may include fewer than or greater than all of the components shown in FIG. 1. In addition, the components in FIG. 1 may communicate via any suitable communication medium (including the Internet), using any suitable communication protocol.

Figure 2:
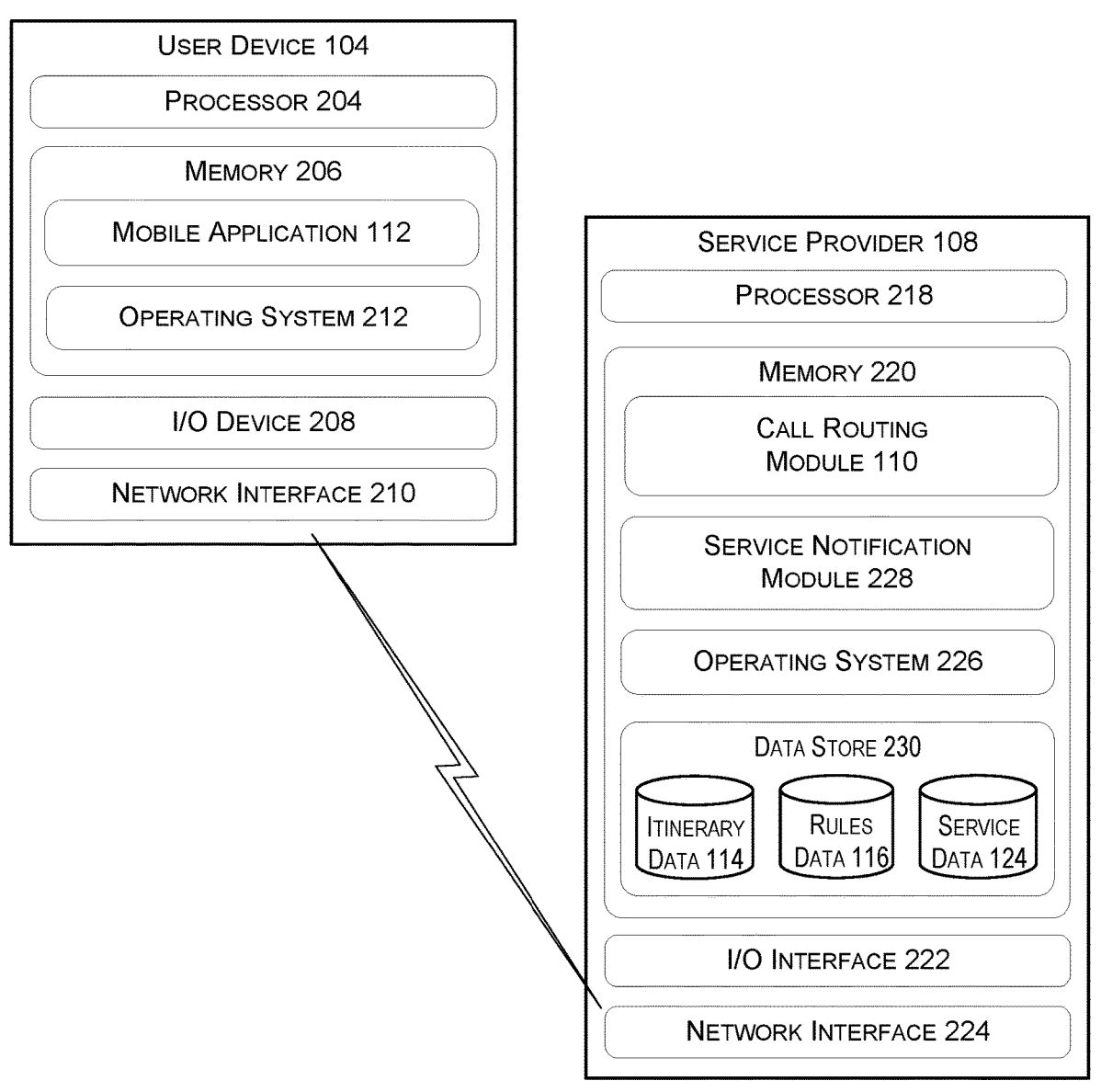
FIG. 2 depicts an exemplary general computing environment for providing enhanced services based on itinerary data in accordance with some embodiments.

FIG. 2 depicts an exemplary general computing environment for providing enhanced services based on itinerary data in accordance with some embodiments. Functionality for elements of a communication network and user devices for the techniques described herein are generally hosted on computing devices. The user device 104 and service provider computer 108 in FIG. 2 may be an example of the respective user device 104 and service provider computer 108 of FIG. 1 in communication via a communication network (e.g., network 106 of FIG. 1). In some embodiments, additional electronic devices (such as additional electronic devices 118 of FIG. 1) may be included in the computing environment.

The user device 104 may include a processor 204 and a computer readable memory 206. The processor 204 may be a central processing unit, and/or a dedicated controller such as a microcontroller. The user device 104 may further include an input/output (I/O) device 208, and/or a network interface 210. The I/O device 208 may be any controller card, such as a universal asynchronous receiver/transmitter (UART) used in conjunction with a standard I/O interface protocol such as RS-232 and/or Universal Serial Bus (USB). The network interface 210, may potentially work in concert with the I/O device 208 and may be a network interface card supporting Ethernet and/or Wi-Fi and/or any number of other physical and/or datalink protocols. Generally, the network will include a communication network. Accordingly, the network interface 210 will include a cellular radio and radio access software layer.

The one or more processors 204 and the memory 206 may implement functionality from one or more software modules and data stores. Such software modules may include routines, program instructions, objects, and/or data structures that are executed by the processors 204 to perform particular tasks or implement particular data types. The memory 206 may include at least an operating system 212 and a mobile application capable of implementing at least a portion of the functionality described herein (e.g., mobile application 112).

Applications such as mobile application 112 and operating system 212 may be comprised of software components. In general, a software component is a set of computer-executable instructions stored together as a discrete whole. Examples of software components include binary executables such as static libraries, dynamically linked libraries, and executable programs. Other examples of software components include interpreted executables that are executed on a runtime such as servlets, applets, p-Code binaries, and Java binaries. Software components may run in kernel mode and/or user mode.

Computer-readable media includes, at least, two types of computer-readable media, namely computer storage media and communications media. Computer storage media includes volatile and non-volatile, removable and non-removable media implemented in any method or technology for storage of information such as computer readable instructions, data structures, program modules, or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other non-transmission medium that can be used to store information for access by a computing device. In contrast, communication media may embody computer readable instructions, data structures, program modules, or other data in a modulated data signal, such as a carrier wave, or other transmission mechanisms. As defined herein, computer readable storage media may be "non-transitory" in that it does not consist of, and is not formed exclusively by, modulated data signals, such as a carrier wave. The user device 104 may also be equipped with various hardware. The hardware may include additional user interface, data communication, data storage hardware, or sensors (e.g., a camera, a gyroscope, an accelerometer, a compass, etc.). For example, the user interfaces may include a data output device (e.g., visual display, audio speakers), and one or more data input devices. The data input devices may include but are not limited to, combinations of one or more of keypads, keyboards, mouse devices, touch screens that accept gestures, microphones, voice or speech recognition devices, and any other suitable devices.

The mobile application 112 may be configured to, in conjunction with the processor 204, facilitate communication between a user of the user device 104 and the service provider computer 108. Particularly, the mobile application may be configured to, upon execution, cause the user device to establish a communication session with the service provider computer via a communication channel (e.g., via network 106). In some embodiments, the mobile application may be configured to convey input received from a user (e.g., itinerary data, rules, preferences, etc.) to the service provider computer via the communication session. In some embodiments, the mobile application may be configured to present information to the user that is provided to the user device by the service provider computer platform.

In some embodiments, the mobile application 112 may be configured to overwrite a current user device identifier (e.g., a phone number) associated with the user device with a temporary user device identifier associated with a particular region or area in which the user device is located. In some embodiments, the mobile application provisions the temporary user device identifier onto the user device when the user device obtains an indication of the temporary user device identifier. In some cases, the indication of the temporary user device identifier is received upon being obtained from a machine-readable code that is scanned using the user device. In some embodiments, the temporary user device identifier is stored in the memory of the user device upon being received from the service provider computer. In these embodiments, the mobile application may be configured to provision the temporary user device identifier onto the user device upon determining that one or more conditions have been met. For example, the temporary user device identifier may be associated with a geographic region or area. In this example, the temporary user device identifier may be provisioned onto the user device upon detecting that the user device has entered within that geographic region or area.

A service provider computer 108 is any computing device that may participate in a network and hosts a service accessible by the user device 104. The network may be, without limitation, a local area network (LAN), a virtual private network (VPN), a communication network, or the Internet. The service provider computer 108 may include a processor 218, a memory 220, an input/output interface 222 and/or a network interface 224. The memory 220 may include at least an operating system 226, a module for managing call routing based on itinerary data (e.g., call routing module 110), and a module for managing itinerary-based notifications to applicable services (e.g., service notification module 228). Additionally, the service provider computer 108 may have access to a data store 230 that includes one or more database tables. For example, the data store 230 may include a database of itinerary data 114 that comprises information about events associated with a user, a database of user rules data 116 that comprises information on one or more rules applicable to a user, and a database of service data 124 that comprises information about one or more services associated with various users. Service data 124 may comprise a mapping of account identifiers for one or more users to accounts maintained by various service providers. In some embodiments, each such mapping may comprise an account identifier for an account maintained by the service provider and an account identifier associated with an account maintained by a third-party service. In some cases, a service provider computer 108 may play the role of an EIT server. Alternatively, the service provider computer 108 may be a server accessible via the Internet.

The call routing module 110 may be configured to, in conjunction with the processor 218, provide call routing for user devices operating on a wireless carrier network. In some embodiments, the call routing module is configured to route messages to a user device that is associated with a user device identifier indicated within the message. In some embodiments, a user device may be associated with multiple user device identifiers. For example, a user device may be associated with a permanent user device identifier as well as one or more temporary user device identifiers. In this example, messages directed toward any of the multiple user device identifiers may be routed to the user device by the call routing module. Upon receiving a message to be routed to a user device, the call routing module may, upon receiving a message to be routed, identify a user device associated with that user device identifier as well as a user device identifier that is currently provisioned onto that user device. Once the user device identifier currently provisioned onto the user device has been identified, the message may be routed to the user device via that user device identifier. In some embodiments, the call routing module may be configured to identify a user device identifier that is currently associated with a user device based on a region in which the user device is determined to be within based on itinerary data.

The service notification module 228 may be configured to, in conjunction with the processor 218, provide notifications to one or more providers of services associated with a user device based upon itinerary data. For example, the service notification module may identify a number of services associated with a user device (e.g., via service data 124) as well as one or more rules dictating conditions under which each of the number of services should be provided a notification. Such conditions may include the occurrence of an event (e.g., the user is traveling) or an indication that the user device has entered or exited a particular region. By way of illustrative example, a user device may be determined to be associated with a home security service as well as one or more credit card accounts. In this example, upon detecting, based on itinerary data for a user, that the user is visiting a particular country and is outside of his or her own country, the service notification module may provide a notification to the home security service provider computer to temporarily increase a level of provided service. Additionally, the service notification module may provide a notification to the one or more credit card account issuers to prevent transactions in the visited country from being rejected based on location.

In some embodiments, the services of a service provider computer 108 may be provided via a cloud platform. Accordingly, a service provider computer 108 may either be a physical dedicated server or a virtual machine. In the latter case, the cloud platform may represent a plurality of disaggregated servers which provide virtual application server functionality and virtual storage/database functionality. The disaggregated servers are physical computer servers, which may each have a processor, a memory, an I/O interface and/or a network interface. The features and variations of the processor, the memory, the I/O interface and the network interface are substantially analogous to those described for service provider computer. Differences may be where the disaggregated servers are configured to satisfy different objectives or balance competing objectives in different ways. For example, disaggregated servers can be optimized for throughput and/or for disaggregation.

Cloud platform services may be made accessible via an integrated cloud infrastructure. Such a cloud infrastructure not only provides access to cloud services, but also to billing services and other monetization services. A cloud infrastructure may provide additional service abstractions such as Platform as a Service (PAAS), Infrastructure as a Service (IAAS), and Software as a Service (SAAS).

Figure 3:
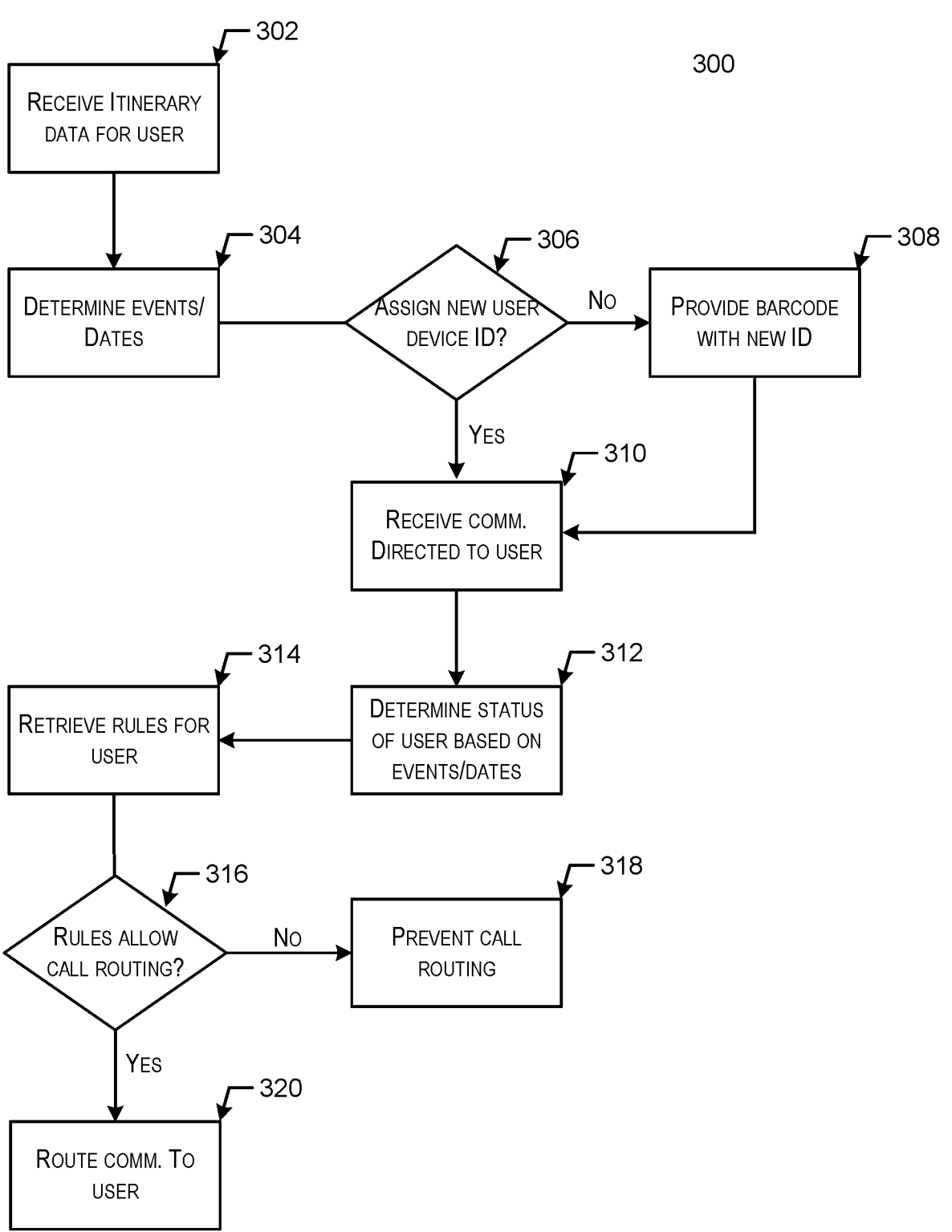
FIG. 3 depicts a flow diagram illustrating an exemplary process for enabling improved call routing based on itinerary data in accordance with embodiments.

FIG. 3 depicts a flow diagram illustrating an exemplary process for enabling improved call routing based on itinerary data in accordance with embodiments. The process 300 is illustrated as a logical flow diagram, each operation of which represents a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be omitted or combined in any order and/or in parallel to implement this process and any other processes described herein.

Some or all of the exemplary process 300 (or any other processes described herein, or variations and/or combinations thereof) may be performed under the control of one or more computer systems configured with executable instructions and may be implemented as code (e.g., executable instructions, one or more computer programs or one or more applications). In accordance with at least one embodiment, the process 300 of FIG. 3 may be performed by one or more computing devices as shown in FIG. 1. For example, the process 300 may be performed by a service provider computer 108 as described with respect to FIG. 1. The code may be stored on a computer-readable storage medium, for example, in the form of a computer program including a plurality of instructions executable by one or more processors. The computer-readable storage medium may be non-transitory.

At block 302, process 300 involves receiving itinerary data for a user. In some embodiments, this may involve receiving information from a third-party computer that manages event bookings (e.g., booking application servers 110 of FIG. 1). For example, the service provider computer may receive an indication of a hotel reservation made by a user from a travel agency server or from a server operated on behalf of the hotel.

At block 304, process 300 involves determining one or more events and corresponding dates from the received itinerary data. For example, the service provider computer may associate a lodging event with the user for a particular range of dates/times that correspond to the received indication of the hotel reservation. The lodging event may further include a location of the hotel at which the user will be located as well as dates and times that the user will be at the location.

At block 306, process 300 involves determining whether a new, and potentially temporary, user device identifier is to be assigned to the user device. In some embodiments, this determination may be made based upon a location associated with the event within the itinerary data. For example, the service provider computer may determine that a new user device identifier associated with a location should be assigned to the user device upon determining that the location being visited by the user is outside of a service range currently associated with the user device. The service provider computer maintains a mapping of the identified user device identifier to a user device identifier currently associated with the user device.

Upon determining that a new user device identifier is to be assigned ("yes" from the decision block 306), the service provider computer may identify an appropriate user device identifier to be associated with the user device. The new user device identifier may be a user device identifier associated with the location being visited by the user. The service provider computer may generate a machine-readable code that includes at least the identified user device identifier and provide the machine-readable code to the user at block 308. The machine-readable code may be provided for presentation to the user. For example, the machine-readable code may be provided in an email message or text message, such that the machine-readable code can be scanned using a machine-readable code scanner of the user device. Upon the machine-readable code being scanned, the user device that scanned the machine-readable code is caused to be provisioned with the new user device identifier, such that communications directed to the new user device identifier are routed to the user device.

Upon determining that no new user device identifier is to be assigned ("no" from the decision block 306), process 300 involves the service provider computer computer receiving an indication of a communication directed to the user device of the user at block 310. The service provider computer, upon detecting this communication, determines a current status of the user based on the received itinerary data associated with the user at block 312. For example, the service provider computer may compare dates and times associated with determined events from the itinerary data to a current time to determine a current status of the user at the time of the call.

At block 314, process 300 involves retrieving rules stored in association with the user. The rules may be provided to the service provider computer by the user prior to the call being received. For example, the user may provide one or more sets of users that are allowed to, or prevented from being able to, contact the user during particular statuses.

At block 316, the service provider computer determines, based on a status of the user determined at 312 and the retrieved rules, whether the caller has authority to communicate with the user at the time of the call.

Upon determining the caller does not have authority to communicate with the user ("no" from the decision block 316), process 300 involves the service provider computer??? preventing the call from being routed to the user at 318. In some embodiments, the call is routed to the user's voicemail instead of to the user device.

Upon determining the caller does have authority to communicate with the user ("yes" from the decision block 316), process 300 involves routing the call to the user device at block 320. In some embodiments, the service provider computer may determine that the user device has been provisioned with a new user device identifier (e.g., via a mapping to a new user device identifier as described at block 306). In these embodiments, the call may be routed to the user device via the new user device identifier.

Figure 4:
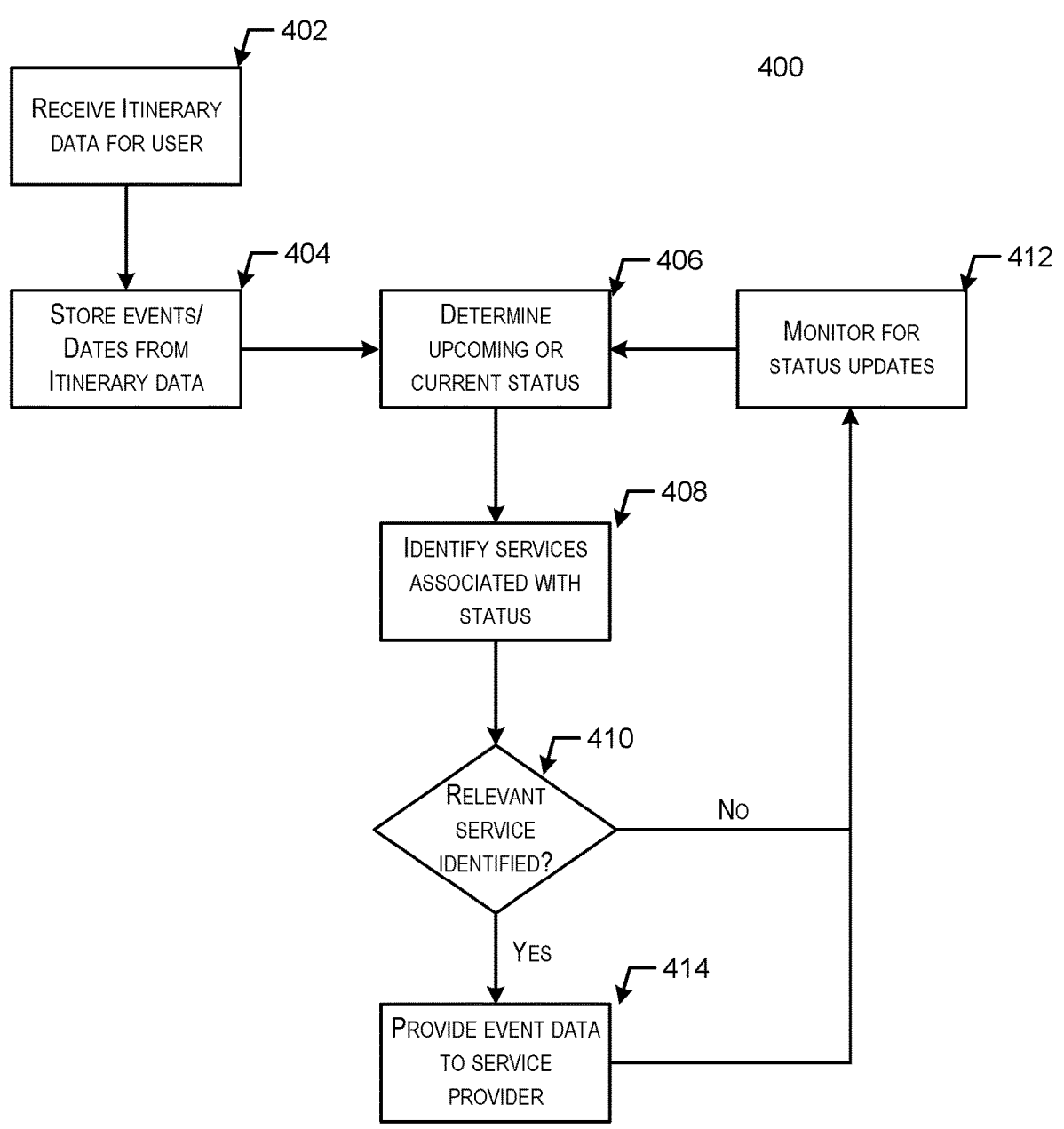
FIG. 4 depicts a flow diagram illustrating an exemplary process for providing enhanced services based on itinerary data in accordance with embodiments.

FIG. 4 depicts a flow diagram illustrating an exemplary process for providing enhanced services based on itinerary data in accordance with embodiments. In accordance with at least one embodiment, the process 400 of FIG. 4 may be performed by one or more computing devices as shown in FIG. 1. For example, the process 400 may be performed by a service provider computer 108 as described with respect to FIG. 1. The code may be stored on a computer-readable storage medium, for example, in the form of a computer program including a plurality of instructions executable by one or more processors. The computer-readable storage medium may be non-transitory.

At block 402, process 400 involves receiving itinerary data for a user. In some embodiments, this may involve receiving information from a third-party computer that manages event bookings (e.g., booking application servers 110 of FIG. 1). For example, the service provider computer may receive an indication of a hotel reservation made by a user from a travel agency server or from a server operated on behalf of the hotel.

At block 404, process 400 involves storing one or more events and corresponding dates from the received itinerary data in association with the user. For example, the service provider computer may associate a lodging event with the user for a particular range of dates/times that correspond to the received indication of the hotel reservation. The lodging event may further include a location of the hotel at which the user will be located as well as dates and times that the user will be at the location.

At block 406, process 400 involves determining an upcoming or current status of the user based on the itinerary data for the user. This may involve comparing a current date/time to dates/times of events stored in relation to the user to determine what events are ongoing as well as what events will occur shortly. A current status may be associated with a user for an event that is currently ongoing whereas an upcoming status may be associated with the user for an event that will occur within some threshold amount of time. It should be noted that multiple statuses may be associated with a user at a particular point in time based on itinerary data for that user.

At block 408, process 400 involves identifying one or more services associated with the determined statuses. Services associated with an account may be determined based on a mapping of accounts maintained by the service provider (e.g., service data 124 as described with respect to FIG. 2). In some embodiments, a status may be associated with one or more actions to be taken with respect to each of the identified services. For example, the service provider computer may store an indication of modifications or updates to be made to various services during particular statuses. Each of the identified services are associated with a provider of those services. The provider of a service may be a third-party provider of the service that is unaffiliated with the service provider computer performing process 400. At block 410, process 400 may determine whether one or more modifications should be made to the identified services based upon the current or upcoming status.

Upon determining that no service modifications are required ("no" from the decision block 410), process 400 involves the continuing to monitor for status updates. Statuses may be updated as new events occur.

Upon determining that service modifications are required ("yes" from the decision block 410), process 400 involves providing event data to the third-party providers of each of the services that require modification at 414. In some embodiments, the service provider computer may provide event data to the third-party provider of the identified service. For example, the third-party provider of the identified service may be provided an indication of a location of the user as well as a period of time for which the user will be at that location. In another example, the third-party provider of the identified service may be provided an indication of an additional service or service modification to be implemented as well as a period of time for which the modification should be effective. Once the event data has been provided to the appropriate third-party providers of the services, the process may continue to block 412, where it may involve monitoring for status updates. Statuses may be updated as new events occur.

Figure 5:
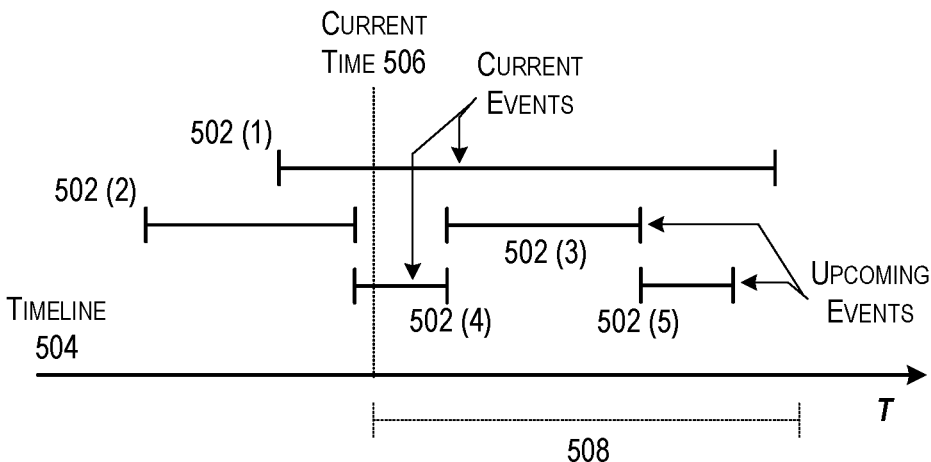
FIG. 5 depicts an example of itinerary data that may be associated with a user device in accordance with some embodiments.

FIG. 5 depicts an example of itinerary data that may be associated with a user device in accordance with some embodiments. As noted elsewhere, the itinerary data may include a number of events, such as events 502 (1-5), that are aggregated in relation to a timeline 504. A timeline may be any suitable representation of time T. Events may be generated based on information received from a number of different sources. In some cases, events may be generated based on information provided by a user. In some cases, events may be generated based on information provided by one or more third-party service provider computers, such as the booking application servers 110 described with respect to FIG. 1 above.

Each event 502 included within the itinerary data may include at least an event type (e.g., an event classification) and a period of time related to the event. In some embodiments, one or more events may further include a location associated with the event. A period of time as included within an event may comprise a beginning time and an end time for the event.

In some embodiments, current events and upcoming events may be determined from itinerary data with respect to a current time 506. Current events may be events 502 within the itinerary data that overlap with a current time 506. In the depicted example, events 502 (1) and 502 (4) may be determined to be current events based on their overlap with the current time 506. Upcoming events may be events 502 within the itinerary data that occur within a predetermined period of time 508 from the current time.

FIG. 6 depicts a flow diagram showing an example process flow for provisioning a temporary user device identifier onto a user device based on itinerary data in accordance with embodiments. The process 600 may be performed by a module or other component implemented within a user device. For example, the process 600 may be performed by a call routing module 120 as described herein. The process 600 is illustrated as a collection of blocks in a logical flow chart, which represents a sequence of operations that can be implemented in hardware, software, or a combination thereof. In the context of software, the blocks represent computer-executable instructions that, when executed by one or more processors, perform the recited operations. Generally, computer-executable instructions may include routines, code segments, programs, objects, components, data structures, and the like that perform particular functions or implement particular abstract data types. The order in which the operations are described is not intended to be construed as a limitation, and any number of the described blocks can be combined in any order and/or in parallel to implement the process.

At 602, the process 600 comprises receiving itinerary data associated with a user device. Such itinerary data may comprise an indication of at least one event associated with the user device. In some embodiments, the user device is associated with a service area and an assigned user device identifier corresponding to that service area. An assigned user device identifier may comprise any suitable means of uniquely identifying the user device. For example, where the user device is a mobile phone, the assigned user device identifier may comprise a phone number assigned to that phone number. In some embodiments, the itinerary data comprises a time period associated with the at least one event. In some cases, the time period comprises a beginning time and an end time. In some embodiments, an event included in the itinerary data is generated from booking information received from a booking application server.

At 604, the process 600 comprises determining, based on the event, a temporary user device identifier to be provisioned onto the user device. In some embodiments, the at least one event relates to the user device entering a geographic region outside of the service area. In these embodiments, the at least one event and the temporary user device identifier may each be associated with the geographic region. For example, the temporary user device identifier may comprise a phone number corresponding to the geographic region.

At 606, the process 600 comprises providing the temporary user device identifier to the user device to be provisioned onto the user device. In some embodiments, the temporary user device identifier is provided to the user device within a machine-readable code. In some embodiments, the temporary user device identifier is provided to the user device via a message communicated to the user devices, such as a push notification.

At 608, the process 600 comprises routing communications directed to the temporary user device identifier to the user device while the event is occurring. In some embodiments, while the at least one event is occurring communications directed toward either the temporary user device identifier or the assigned user device identifier are routed to the user device.

During an event, the user device may be located within a geographic area that is outside of a service area to which the user device is assigned. In these embodiments, the user device may typically operate on a wireless carrier network for a service region and the temporary user device identifier may be assigned to a different wireless carrier network that operates within the geographic region. In this example, the wireless carrier network for the service region, upon receiving communications routed to the assigned user device identifier, may map the communications to the temporary user device identifier. The communications may then be routed to the wireless carrier network for the geographic region to be routed to the user device via the temporary user device identifier.

At 610, the process 600 comprises removing the temporary user device identifier from the user device after the event. In some embodiments, this may comprise removing the temporary user device identifier from the memory of the user device and/or provisioning the originally assigned user device identifier back onto the user device.

Figure 7:
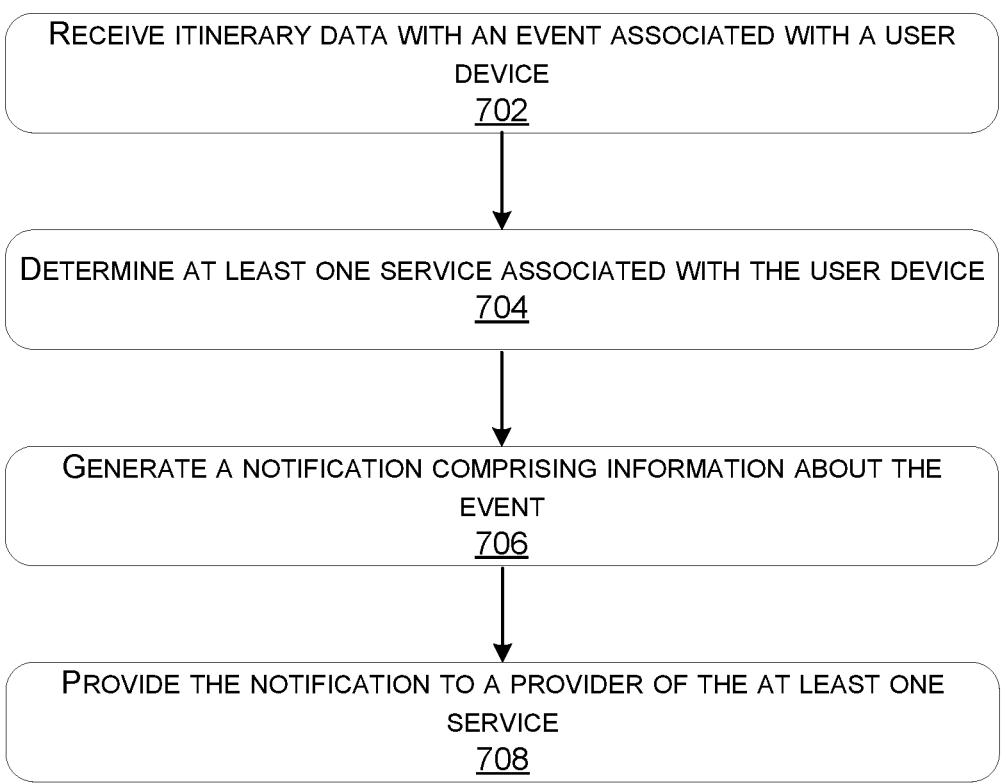
FIG. 7 depicts a flow diagram showing an example process flow for providing notifications to providers of services based on itinerary data in accordance with embodiments.

FIG. 7 depicts a flow diagram showing an example process flow for providing notifications to providers of services based on itinerary data in accordance with embodiments. The process 700 may be performed by a module or other component implemented within a user device. For example, the process 700 may be performed by a call routing module 120 as described herein.

At 702, the process 700 comprises receiving itinerary data that includes at least one event associated with a user device. As noted elsewhere, such itinerary data may comprise an indication of at least one event associated with the user device. In some embodiments, the user device is associated with a service area and an assigned user device identifier corresponding to that service area.

At 704, the process 700 comprises determining at least one service associated with the user device. In some embodiments, the at least one service comprises at least one of a security service, an emergency service, or a credit authentication service. The at least one service associated with the user device may be determined by virtue of the service being associated with the user device identifier assigned to that user device. For example, each service provider computer may maintain a number of accounts associated with multiple users of the service. In this example, each of the number of accounts may be associated with a phone number or other identifier that may correspond to a user device identifier for the user device.

By way of example, upon determining (based on itinerary data) that a user will be leaving his or her service area, a security service may be identified with respect to that user. A determination may then be made (e.g., based on user preferences stored in relation to the security service) that the security service should be upgraded or otherwise altered based on the user leaving the service region. A notification may then be generated to upgrade the security service and provided to the security service provider computer. In another example, upon determining that the user will be leaving his or her service area, a credit authentication service may be identified with respect to the user. Such a credit authentication service may relate to a credit card owned by the user. In this example, a notification may be generated that indicates dates and times in which the user will be in a particular region. The notification may then be sent to the credit authentication service to enable the service to make authentication decisions in relation to transactions conducted by the user. In another example, an emergency service, such as e911, may be identified with respect to the user. In this example, a notification may be generated indicating the user's location at particular dates/times and provided to the emergency service. In the event of an emergency involving the user, the emergency service may determine the user's location based on that notification.

At 706, the process 700 comprises generating a notification comprising information about the event. In some embodiments, the notification comprises an indication of an event type and at least a period of time over which the event is to occur.

At 708, the process 700 comprises providing the generated notification to a provider of the at least one service. In some embodiments, this may comprise routing the notification to an internet protocol (IP) address associated with the provider of the service.

CONCLUSION

Although the subject matter has been described in language specific to features and methodological acts, it is to be understood that the subject matter defined in the appended claims is not necessarily limited to the specific features or acts described herein. Rather, the specific features and acts are disclosed as exemplary forms of implementing the claims.

What is claimed is:

1. A method comprising:
   receiving itinerary data that comprises an indication of a user associated with a user device will be traveling outside of a service area associated with the user device;
   determining that an emergency service associated with the user device is relevant to the user associated with the user device traveling outside of the service area associated with the user device;
   generating a notification comprising information about the user associated with the user device traveling outside of the service area associated with the user device, the information indicating (i) a timeframe over which the user associated with the user device will be traveling outside of the service area associated with the user device and (ii) updated profile information of the user indicating a location of the user while traveling outside of the service area, wherein the profile information indicates to a provider of the emergency service a location of the user of the user device during instances where real-time location information is unavailable; and
   providing the notification to the provider of the emergency service.

2. The method of claim 1, wherein:
   the user device is assigned a user device identifier corresponding to the service area, and
   determining that the emergency service associated with the user device and relevant to the user associated with the user device traveling outside of the service area associated with the user device is based on the user device identifier.

3. The method of claim 1, further comprising:
   determining a user setting that is associated with the emergency service and that indicates to change the emergency service based on the itinerary data,
   wherein generating the notification is based on the user setting.

4. The method of claim 1, wherein providing the notification to the provider of the emergency service comprises:
   routing the notification to an internet protocol address associated with the provider of the emergency service.

5. The method of claim 1, wherein the notification is configured to allow the provider of the emergency service to determine the location of the user associated with the user device.

6. The method of claim 1, further comprising:
   based on the itinerary data, determining a current location of the user of the user device and a likely, future location of the user of the user device,
   wherein determining the that the emergency service associated with the user device is relevant to the user associated with the user device traveling outside of the service area associated with the user device is based on the current location of the user of the user device and the likely, future location of the user of the user device.

7. A system, comprising:

one or more processors; and memory including a plurality of computer-executable components that are executable by the one or more processors to perform a plurality of acts, the plurality of acts comprising:

receiving itinerary data that comprises an indication of a user associated with a user device will be traveling outside of a service area associated with the user device;

determining that an emergency service associated with the user device is relevant to the user associated with the user device traveling outside of the service area associated with the user device;

generating a notification comprising information about the user associated with the user device traveling outside of the service area associated with the user device, the information indicating (i) a timeframe over which the user associated with the user device will be traveling outside of the service area associated with the user device and (ii) updated profile information of the user indicating a location of the user while traveling outside of the service area, wherein the profile information indicates to a provider of the emergency service a location of the user of the user device during instances where real-time location information is unavailable; and providing the notification to the provider of the emergency service.

8. The system of claim 7, wherein:

the user device is assigned a user device identifier corresponding to the service area, and determining that the emergency service associated with the user device and relevant to the user associated with the user device traveling outside of the service area associated with the user device is based on the user device identifier.

9. The system of claim 7, wherein the plurality of acts comprise:

determining a user setting that is associated with the emergency service and that indicates to change the emergency service based on the itinerary data, wherein generating the notification is based on the user setting.

10. The system of claim 7, wherein providing the notification to the provider of the emergency service comprises:

routing the notification to an internet protocol address associated with the provider of the emergency service.

11. The system of claim 7, wherein the notification is configured to allow the provider of the emergency service to determine the location of the user associated with the user device.

12. The system of claim 7, wherein the plurality of acts comprise:

based on the itinerary data, determining a current location of the user of the user device and a likely, future location of the user of the user device, wherein determining the that the emergency service associated with the user device is relevant to the user associated with the user device traveling outside of the service area associated with the user device is based on the current location of the user of the user device and the likely, future location of the user of the user device.

13. One or more non-transitory computer-readable media storing computer-executable instructions that upon execution cause one or more computers to perform acts comprising:

receiving itinerary data that comprises an indication of a user associated with a user device will be traveling outside of a service area associated with the user device;

determining that an emergency service associated with the user device is relevant to the user associated with the user device traveling outside of the service area associated with the user device;

generating a notification comprising information about the user associated with the user device traveling outside of the service area associated with the user device, the information indicating (i) a timeframe over which the user associated with the user device will be traveling outside of the service area associated with the user device and (ii) updated profile information of the user indicating a location of the user while traveling outside of the service area, wherein the profile information indicates to a provider of the emergency service a location of the user of the user device during instances where real-time location information is unavailable; and providing the notification to the provider of the emergency service.

* * * * *